(12) United States Patent
Berwald et al.

(10) Patent No.: US 8,984,742 B2
(45) Date of Patent: Mar. 24, 2015

(54) METHOD OF MAKING SOFT MAGNETIC AMORPHOUS METAL ELECTROMECHANICAL COMPONENT

(75) Inventors: Thomas J. Berwald, Grand Haven, MI (US); Kendall Scott Page, Holland, MI (US)

(73) Assignee: Light Engineering, Inc., Indianapolis, IN (US)

( * ) Notice: Subject to any disclaimer, the term of this patent is extended or adjusted under 35 U.S.C. 154(b) by 1192 days.

(21) Appl. No.: 12/217,672

(22) Filed: Jul. 8, 2008

(65) Prior Publication Data

US 2009/0032141 A1  Feb. 5, 2009

Related U.S. Application Data

(63) Continuation-in-part of application No. 10/763,728, filed on Jan. 23, 2004, now Pat. No. 7,395,596, which is a continuation-in-part of application No. 10/458,944, filed on Jun. 11, 2003, now Pat. No. 7,018,498.

(51) Int. Cl.
| | |
|---|---|
| *H01F 3/04* | (2006.01) |
| *H01F 41/06* | (2006.01) |
| *H01F 41/02* | (2006.01) |
| *H02K 1/02* | (2006.01) |
| *H02K 15/02* | (2006.01) |

(52) U.S. Cl.
CPC .............. *H01F 3/04* (2013.01); *H01F 41/0206* (2013.01); *H01F 41/0213* (2013.01); *H01F 41/0226* (2013.01); *H02K 1/02* (2013.01); *H02K 15/02* (2013.01); *H02K 15/024* (2013.01)

USPC .. 29/607; 29/605; 310/216.004; 310/216.069

(58) Field of Classification Search
CPC ... H01F 3/04; H01F 41/0206; H01F 41/0213; H01F 41/0226; H02K 15/02; H02K 15/024; H02K 1/01
USPC ................... 29/609, 607, 605, 596, 598, 604; 156/154, 191, 193, 194; 310/216.004, 310/216.069, 216.106
See application file for complete search history.

(56) References Cited

U.S. PATENT DOCUMENTS

| | | | |
|---|---|---|---|
| 2,208,811 A * | 7/1940 | Kiehne | 29/602.1 |
| 2,293,951 A | 8/1942 | Seastone et al. | 175/21 |
| 2,495,167 A | 1/1950 | Horstman et al. | 148/14 |
| 2,554,262 A | 5/1951 | Nagel | 154/43 |

(Continued)

FOREIGN PATENT DOCUMENTS

| | | |
|---|---|---|
| DE | 4030124 A | 3/1992 |
| GB | 597218 A | 1/1948 |

(Continued)

*Primary Examiner* — A. Dexter Tugbang
(74) *Attorney, Agent, or Firm* — Ernest D. Buff & Assoc. LLC; Ernest D Buff; Dave Narasimhan

(57) ABSTRACT

A three dimensional soft magnetic metal mass suitable for milling is formed wrapping soft magnetic metal ribbon into a three dimensional shape and then applying adhesive to the three dimensional shape. The adhesive permeates the three dimensional shape. The adhesive is then cured. If the soft magnetic metal mass is made as a toroid, then it could be processed into an electromechanical component. The electromechanical component would then be suitable for use in very high frequency electric motors.

13 Claims, 3 Drawing Sheets

(56) References Cited

U.S. PATENT DOCUMENTS

| | | | |
|---|---|---|---|
| 3,401,287 A | 9/1968 | French | 310/168 |
| 4,621,248 A | 11/1986 | Shigeta et al. | 336/178 |
| 5,028,830 A | 7/1991 | Mas | 310/211 |
| 6,462,456 B1 | 10/2002 | DeCristofaro et al. | 310/216 |
| 6,803,694 B2 * | 10/2004 | Decristofaro et al. | 310/216.106 |
| 7,067,950 B2 | 6/2006 | Hirzel | 310/216 |

FOREIGN PATENT DOCUMENTS

| | | | | |
|---|---|---|---|---|
| JP | 56104425 A | | 8/1981 | |
| JP | 58204514 A | * | 11/1983 | 29/607 |
| JP | 2007-281314 | * | 10/2007 | |

* cited by examiner

METHOD OF MAKING SOFT MAGNETIC AMORPHOUS METAL ELECTROMECHANICAL COMPONENT

This application is a continuation-in part of U.S. application Ser. No. 10/763,728, filed Jan. 23, 2004, which is a continuation-in-part of U.S. application Ser. No. 10/458,944, filed Jun. 11, 2003 (now U.S. Pat. No. 7,018,498).

BACKGROUND OF THE INVENTION

Multi-pole rotating electro-mechanical devices, such as motors, generators, re-gen motors, alternators, brakes and magnetic bearings are comprised of rotors and electro-mechanical components. AC motors rotate by producing a rotating magnetic field pattern in the electro-mechanical component that causes the rotor to follow the rotation of this field pattern. As the frequency varies, the speed of the rotor varies. To increase the speed of the motor, the frequency of the input source must be increased.

High frequency motors manufactured with the proper materials can be very efficient. For certain applications, like electric or hybrid cars, highly efficient electric motors are desirable.

The construction of electro-mechanical components for high frequency electric motors and generators is problematic. Iron or steel components are quite common in electric motors and generators. However, at high frequencies, such as those greater than 400 Hz, conventional iron or steel components are no longer practical. The high frequency of the AC source increases the core losses of the iron or steel components, reducing the overall efficiency of the motor. Additionally, at very high frequencies, the component may become extremely hot, cannot be cooled by any reasonably acceptable means and may cause motor failure.

For construction of electro-mechanical components used in high frequency electric motors, ribbon made from soft magnetic material provides distinct advantages. defined as 0.008" and thicker, non grain oriented with a typical Si content of 3%+/−12% or 2) alternate soft materials that are 0.007" or thinner with Si content of 3% to 7%, amorphous, or nanocrystalline alloys and other grain oriented or non grain oriented alloys. Some soft magnetic ribbon materials exhibit inherent characteristics that make their use in high frequency electro-mechanical rotating devices highly desirable. Some soft magnetic ribbons are easy to magnetize and demagnetize, which means an electromechanical component made with these metals would have low power loss, low temperature rise at high frequency, extremely fast magnetization and easy conversion of electrical to mechanical energy. An electro-mechanical component made of such an metal would generate less core losses and be able to operate at much higher frequencies, resulting in motors and generators of exceptional efficiency and power density.

Soft magnetic materials are commercially produced as ribbon or strip. A preferred example of a soft magnetic metal ribbon is Metglas®, which is an amorphous material, manufactured by Honeywell, Inc. Soft magnetic metal ribbons are very thin and of varying width. Manufacturing components of soft magnetic metal ribbon requires winding the soft magnetic ribbon into a shape and then heat processing the shape. Simple three dimensional shapes, such as toroids, can currently be constructed from soft magnetic metal ribbon.

However electromechanical components are often not simple three dimensional shapes. The electromechanical component can have numerous slots for accommodating motor coils in a generally toroidal structure.

Attempts to create complex three dimensional configurations from soft magnetic metal ribbon have heretofore been commercially unsuccessful. Various manufacturing techniques have been attempted by industry such as but not limited to: wire electrical discharge machining, electrochemical creep grinding, conventional electrical discharge machining, cutting, stamping, acid etching and fine blanking. None have proven satisfactory for reasons such as cost-effectiveness, manufacturing repeatability, or process cycle time.

This inability to fabricate complex three dimensional shapes from soft magnetic ribbon has been the significant impediment to producing high efficiency axial flux motors and generators. A method to produce electromechanical components from soft magnetic ribbon in a cost effective, end use functional, high volume capable method that will also provide substantial design flexibility for end use requirements is highly desirable.

SUMMARY OF THE INVENTION

A method for forming a three dimensional soft magnetic metal mass suitable for milling consists of wrapping soft magnetic metal ribbon into a three dimensional shape, then applying adhesive to the three dimensional shape. The adhesive is then cured and the cured form is mechanically constrained in three dimensions. The method results in an soft magnetic metal mass which can withstand the mechanical stresses of machining. The three dimensional soft magnetic metal form can be milled using a horizontal mill, a vertical mill, a computer numeric control (CNC) machine, or any other common milling equipment. Thus, complex three dimensional soft magnetic metal shapes can be created.

The ability to create three dimensional soft magnetic metal shapes allows the use of soft magnetic metal for a variety of applications heretofore foreclosed by the mechanical characteristics of soft magnetic metal ribbon.

To manufacture an soft magnetic electromechanical component, soft magnetic metal ribbon is wound into a toroid. The toroid is then placed in a milling assembly. Adhesive is applied to the toroid, and then cured. The toroid is then milled into an electromechanical component shape, and then thermally processed into a electromechanical component.

These and other objects, advantages and features of the invention will be more readily understood and appreciated by reference to the detailed description of the drawings.

DETAILED DESCRIPTION OF THE DRAWINGS

Figure 1:
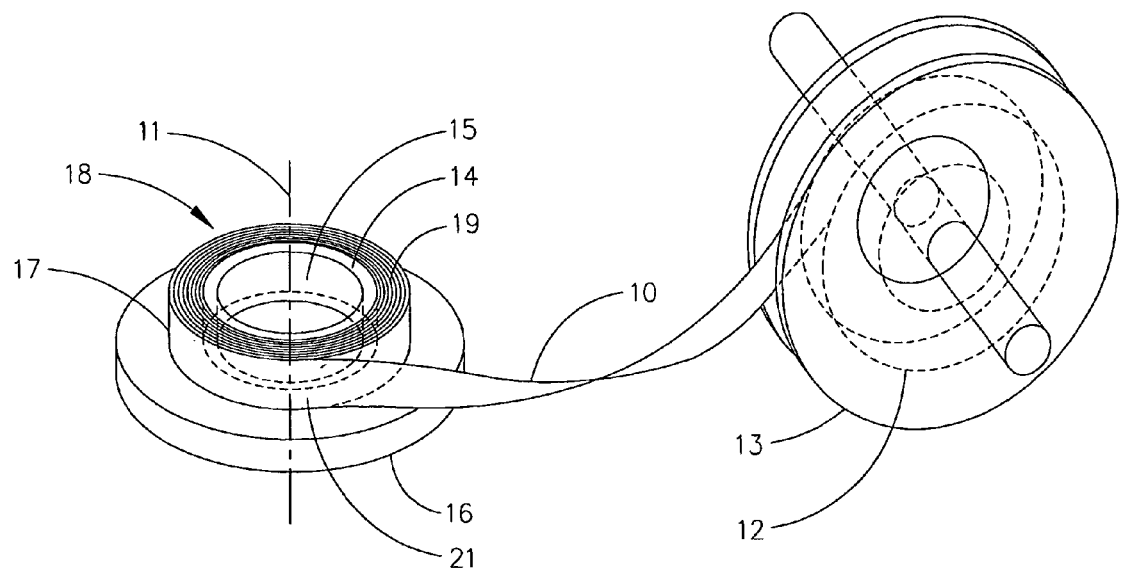
FIG. 1 shows a soft magnetic metal ribbon being wound on an inner ring.

FIG. 1 shows soft magnetic metal ribbon 10 being wound about a winding axis 11 on an inner ring 14. Winding machine 13 contains soft magnetic metal ribbon roll 12. Inner ring 14 is placed on winding plate 16. Soft magnetic metal ribbon 10 is wound on inner ring 14, forming soft magnetic metal toroid 18. Soft magnetic metal toroid 18 has an inner side surface 15, an outer side surface 17, a top 19, and a bottom 21.

While FIG. 1 shows the formation of an soft magnetic metal toroid 18, it will be appreciated that a three dimensional shape could be created with a geometry distinctly different from the soft magnetic metal toroid 18. For example, it would be possible by winding around four corners to create a rectangular prism.

Soft magnetic metal ribbon 10 can be wound using a variety of machines and methods. Preferably, a consistent, firm toroid will have at least an 85% wind density compared to the inherent ribbon density. Soft magnetic metal toroid 18 is then removed from winding plate 16. Soft magnetic metal ribbon 10 can be wound around the inner ring 14 while attached to the inner containment hat 20 as a single unit.

An adhesive is then applied to the soft magnetic ribbon toroid 18 in a manner to permeate the soft magnetic metal toroid 18. Inner ring 14 is still contained within the soft magnetic ribbon toroid 18. A suitable adhesive is Scotch Cast adhesive by 3M, diluted by acetone so as to achieve about a 20% mix by volume. The adhesive is applied to soft magnetic ribbon toroid 18 by an ambient atmospheric soak process. Soft magnetic ribbon toroid 18 is immersed in the adhesive until the adhesive infiltrates the layers.

Alternatively, the adhesive could be applied by immersing soft magnetic ribbon toroid 18 into the adhesive inside a vessel that is evacuated of air. The vacuum created would enhance the infiltration of the adhesive into the soft magnetic ribbon toroid 18 layers. Adhesive could also be applied to the soft magnetic ribbon during the winding process utilizing a wet spray or dry electrolytic deposition process. Alternative resins, epoxies or adhesives may be used. Different brands as well as different types of resins, epoxies or adhesives may be used. Heat cured epoxies that require various temperatures as well a two stage epoxies that cure at room temperature would also be suitable.

After soft magnetic ribbon toroid 18 is sufficiently infiltrated with adhesive, soft magnetic ribbon toroid 18 is allowed to drain. Once dry, soft magnetic ribbon toroid 18 is placed inside an oven for curing. Importantly, the temperature for heat treating the adhesive be a fraction of the temperature for heat processing soft magnetic metal ribbon 10. A preferable fraction is ½, although fractions of ¼ and ¾ might also be satisfactory.

Figure 2:
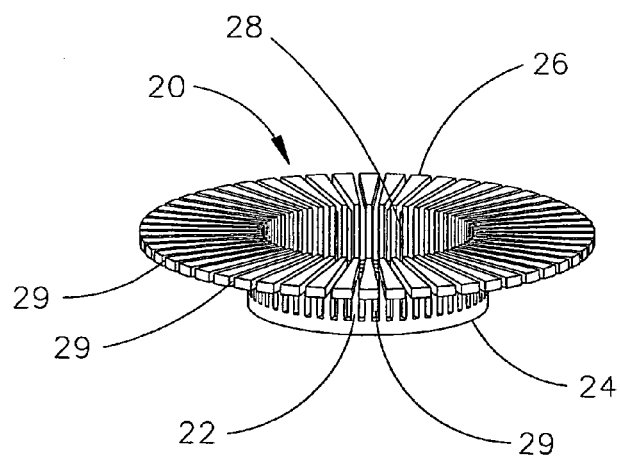
FIG. 2 shows an inner containment hat.

FIG. 2 shows inner containment hat 20. Inner containment hat 20 is a cylinder comprised of a number of columns 22 extending upward from the inner containment hat base 24. Fingers 26 extend outward from columns 22 at approximately a right angle. Fingers 26 increase in width as they extend further from the columns 22. Fingers 26 are arranged in a circle, forming an annulus 28. The columns 22 and fingers 26 form a plurality of inner containment hat grooves 29. Columns 22 of inner containment hat 20 are placed inside inner ring 14.

The height of columns 22 is approximately equal to the height of the soft magnetic metal toroid 18. The diameter of the soft magnetic metal toroid 18 is about equal to the diameter of the annulus 28.

Figure 3:
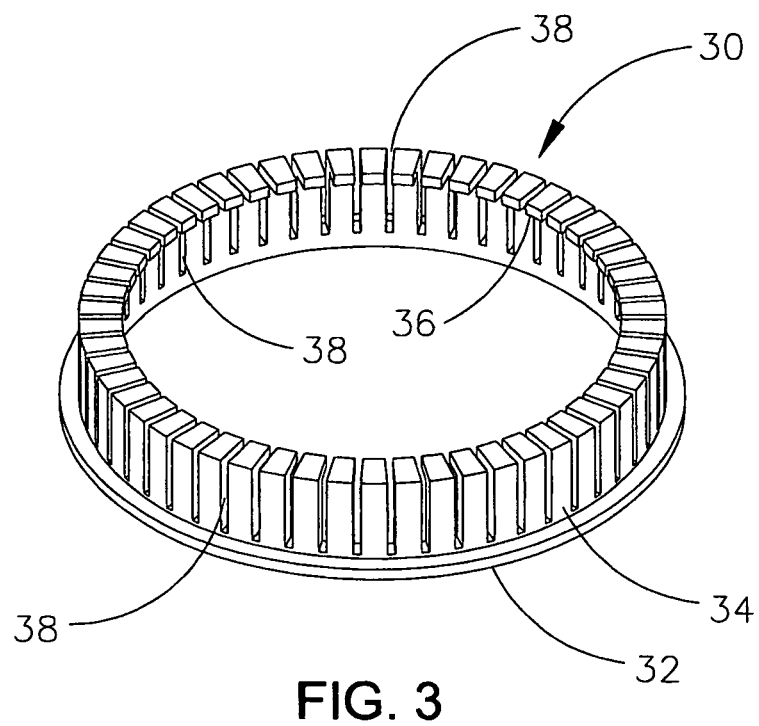
FIG. 3 shows an outer containment hat.

Following the placement of inner containment hat within soft magnetic metal toroid 18, outer containment hat 30 shown in FIG. 3, is placed around soft magnetic metal toroid 18.

Outer containment hat 30 is cylindrical, with a base 32. Bars 34 extend upward from base 32. At the top of each bar 34 is a lug 36 extending inward. Lug 36 for each bar 34 forms a flange for securing the amorphous metal toroid 18 within outer containment hat 30. Bars 34 and lugs 36 form a plurality of outer containment hat grooves 38.

Figure 4:
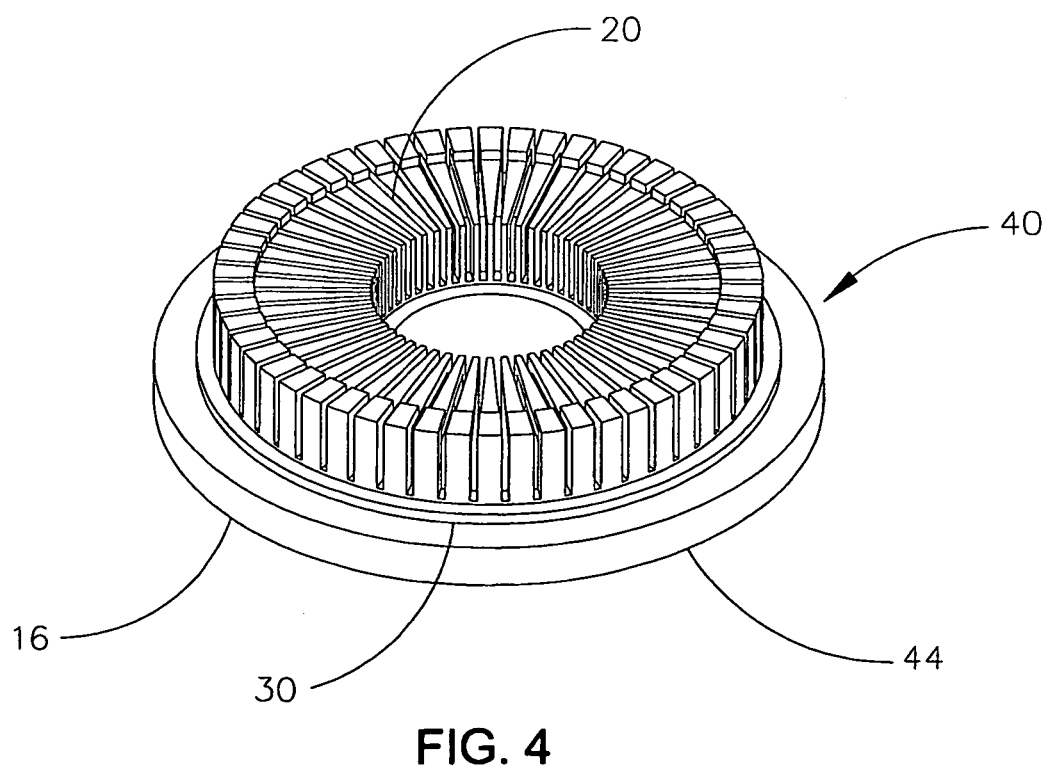
FIG. 4 shows a milling assembly.

Milling assembly 40, shown in FIG. 4, is then formed. Soft magnetic metal toroid 18, still containing inner ring 14, along with the inner containment hat 20 is placed within outer containment hat 30. Lugs 36 and fingers 26 are aligned. Milling assembly 40 contains the soft magnetic metal toroid 18 within a toroidal geometry. Alternatively, soft magnetic metal toroid 18 could be placed within outer containment hat 30 and inner containment hat 20 prior to treatment with the adhesive.

After application of the adhesive and placement within the mechanical constraints of the inner ring 14, inner containment hat 20, and outer containment hat 30, the soft magnetic metal toroid 18 has sufficient structural integrity to withstand the stresses of milling.

Milling plate 44 is placed on the bottom of the soft magnetic metal toroid 18. Milling plate 44 could be the same as winding plate 16.

Soft magnetic metal toroid 18, having been treated with an adhesive, is thus firmly contained within a structure, allowing soft magnetic metal toroid 18 to be milled and formed in three dimensions. Complex shapes can thus be constructed from the metal ribbon toroid 18, allowing structures such as electromechanical components to be made from the soft magnetic metal toroid 18.

Figure 5:
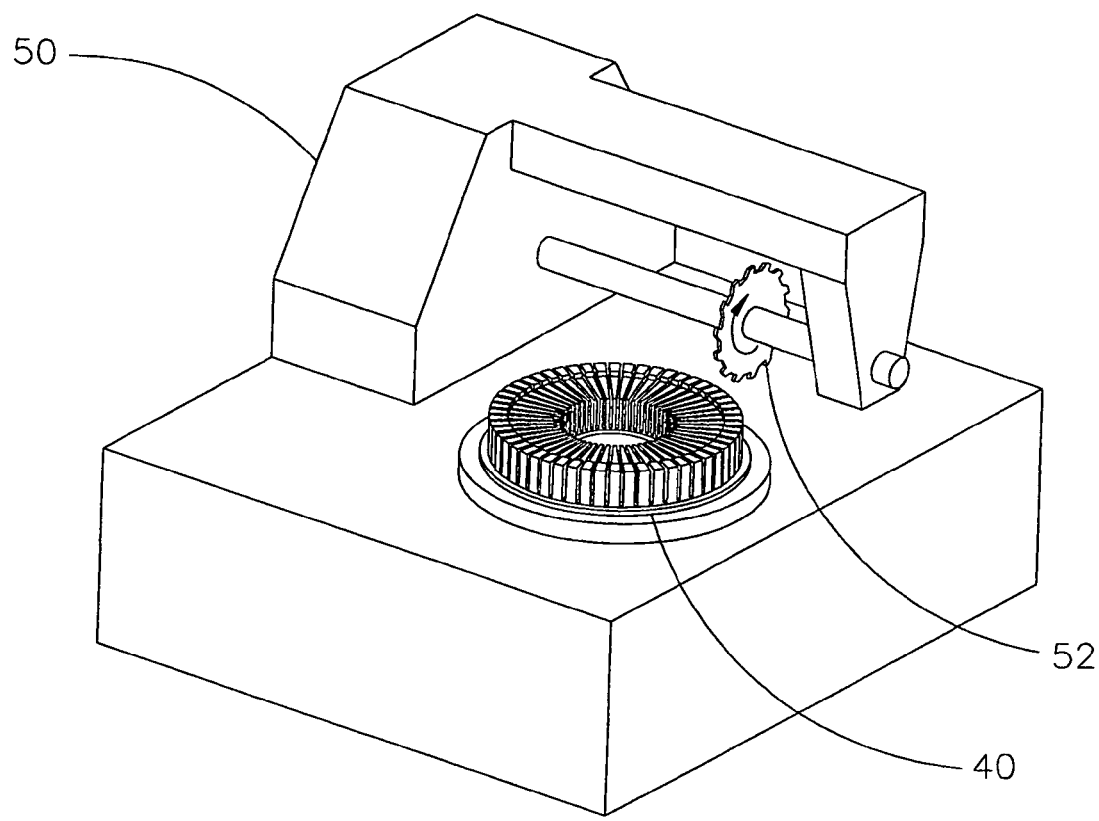
FIG. 5 shows a milling assembly being milled.

As illustrated by FIG. 5, milling assembly 40 is placed in mill 50. Mill 50 could be a horizontal mill, a vertical mill, a CNC machine, or any other type of mill. However, mill 50 should preferably have the axis of rotation of the mill tools 52 perpendicular to the axis of the soft magnetic metal toroid 18. By having the axis of rotation of the mill tool 52 perpendicular to the axis of the soft magnetic metal toroid 18, the depth and width of the slots milled into the soft magnetic metal toroid 18 can be finely controlled.

Mill 50 cuts slots or other geometries into the soft magnetic metal toroid 18. Inner ring 14, still contained within soft magnetic metal toroid 18, acts as a positive mechanical stop for the inside edge of soft magnetic metal toroid 18. Inner ring 14, in conjunction with the epoxy, does not allow strips of soft magnetic metal ribbon 10 to separate during machining, thereby producing clean and accurate cuts.

After the soft magnetic metal toroid 18 is milled into an electromechanical component shape, milling assembly 40 is removed from mill 50. Milling assembly 50 is then thermally processed in accordance with the recommendations of the manufacturer of soft magnetic metal ribbon 10 as required. If the amorphous metal ribbon 10 is Metglas®, thermal processing consists of placing milling assembly 50 into a vacuum furnace at 695 degrees Fahrenheit for approximately sixty minutes. Some soft magnetic ribbon materials require thermal processing to achieve the desired magnetic properties while others require thermal processing to properly relieve the stresses in the milled electromechanical component shape as a result of the milling process. It is conceivable that, given proper mechanical containment during milling, some materials that do not require thermal processing for magnetic properties could forego the thermal processing.

Figure 6:
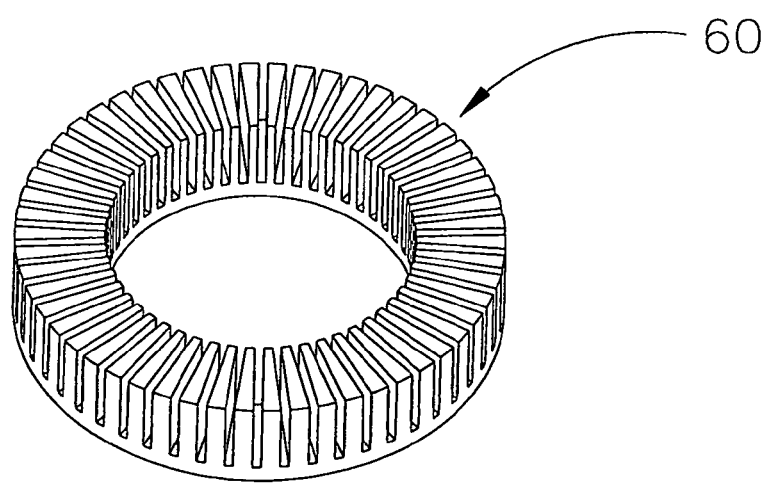
FIG. 6 shows a soft magnetic metal electromechanical component.

Following thermal processing, the milling assembly 40 is disassembled by removing retainer 42, outer containment 30, inner containment hat 20, and inner ring 14. Soft magnetic metal toroid 18 has thus been made into an soft magnetic metal electromechanical component 60, shown in FIG. 6.

The method as described allows for the creation of three dimensional forms from soft magnetic metal ribbon. The applications for such three dimensional forms could be as electromechanical components for a variety of machines.

The above description is of the preferred embodiment. Various alterations and changes can be made without depart- The embodiments of the invention in which an exclusive property or privilege is claimed are defined as follows:

1. A method for forming a three dimensional soft magnetic metal mass suitable for milling, comprising the steps of:
    winding a commercially produced soft magnetic metal ribbon on an inner ring placed on a winding plate into a toroid having three dimensional shape;
    removing said wound toroid from said winding plate and applying a liquid adhesive allowing permeation of said liquid adhesive;
    curing said wound toroid with said liquid adhesive at an adhesive curing temperature;
    placing said adhesive bonded wound toroid in a milling assembly comprising an inner containment bottom hat and an outer containment hat, said outer containment hat having a plurality of slots for the passage of a milling cutter;
    milling slots in said adhesive bonded toroid;
    removing the milled adhesive bonded toroid from said milling assembly; and
    thermally processing said milling assembly with said adhesive bonded milled toroid at a temperature relieving milling stresses and enhancing magnetic properties.

2. A method for manufacturing a soft magnetic metal electro-mechanical component comprising the steps of:
    winding commercially produced soft magnetic metal ribbon on an inner ring placed on a winding plate into a toroid;
    removing said wound toroid from said winding plate and applying a liquid adhesive allowing permeation of said liquid adhesive;
    curing said wound toroid with said liquid adhesive at an adhesive curing temperature;
    placing said adhesive toroid in a milling assembly comprising an inner containment bottom hat and an outer containment hat, said outer containment hat having a plurality of slots for the passage of a milling cutter;
    milling slots in said adhesive bonded toroid into a electro-mechanical component shape and removing said adhesive bonded toroid from the milling assembly;
    applying a magnetic field to said adhesive bonded toroid; and
    thermally processing the electro-mechanical component shape into a electro-mechanical component at a thermal processing temperature improving the magnetic properties of the toroid.

3. The method of claim 2 where the step of containing said adhesive bonded toroid within a toroidal geometry comprises the steps of:
    applying a liquid adhesive to allow permeation of the adhesive into the wound toroid; and
    curing the adhesive at a adhesive curing temperature said adhesive curing temperature being below said thermal processing temperature required for improving the magnetic properties of the wound cured toroid, whereby the exposure to said adhesive curing temperature does not degrade mechanical properties of said adhesive bonded toroid.

4. The method of claim 3 where the step of applying the liquid adhesive to the wound toroid comprises an atmospheric soak process.

5. The method of claim 3 where the step of applying liquid adhesive to the toroid includes the steps of:
    providing a vessel containing the liquid adhesive;
    immersing the wound toroid in the liquid adhesive; and
    evacuating the vessel.

6. The method of claim 3 where the step of curing the liquid adhesive at said adhesive curing temperature and the step of thermally processing the electro-mechanical component shape occurs at the thermal processing temperature, and where the adhesive curing temperature is a fraction of the thermal processing temperature whereby the exposure to said adhesive curing temperature does not degrade mechanical properties of the electro-mechanical component shape.

7. The method of claim 6 where the fraction is about ½.

8. The method of claim 6 where the fraction is about ¾.

9. The method of claim 6 where the fraction is about ¼.

10. The method of claim 2 where the wound toroid has a ribbon winding axis, and the step of milling the wound toroid into the electro-mechanical component shape comprises milling the wound toroid with the cutting tool rotating in an axis perpendicular to the winding axis.

11. The method of claim 2 where the wound toroid has a ribbon winding axis, and the step of milling the wound toroid into the electro-mechanical component shape consists of milling the wound toroid with the cutting tool rotating exclusively in an axis perpendicular to the ribbon winding axis.

12. The method of claim 2 where said adhesive bonded toroid has an inner side surface, an outer side surface, a top and a bottom.

13. A method for manufacturing a soft magnetic metal electro-mechanical component comprising the steps of:
    winding commercially produced soft magnetic metal ribbon on an inner ring and a inner containment bottom hat placed on a winding plate into a toroid;
    removing said wound toroid on the inner ring and the inner containment bottom hat from said winding plate and applying a liquid adhesive, allowing permeation of said liquid adhesive;
    curing said wound toroid with said liquid adhesive at an adhesive curing temperature;
    placing said adhesive wound toroid in a milling assembly comprising an outer containment hat, said outer containment hat having a plurality of slots for passage of a milling cutter;
    milling slots in the wound adhesive bonded toroid into a electro-mechanical component shape;
    applying a magnetic field to said adhesive wound bonded toroid; and
    thermally processing the electro-mechanical component shape into a electro-mechanical component at a thermal processing temperature improving the magnetic properties of said adhesive wound bonded toroid.

* * * * *